(No Model.)
J. A. GOWANS.
SCREW CONVEYER.
No. 422,766. Patented Mar. 4, 1890.
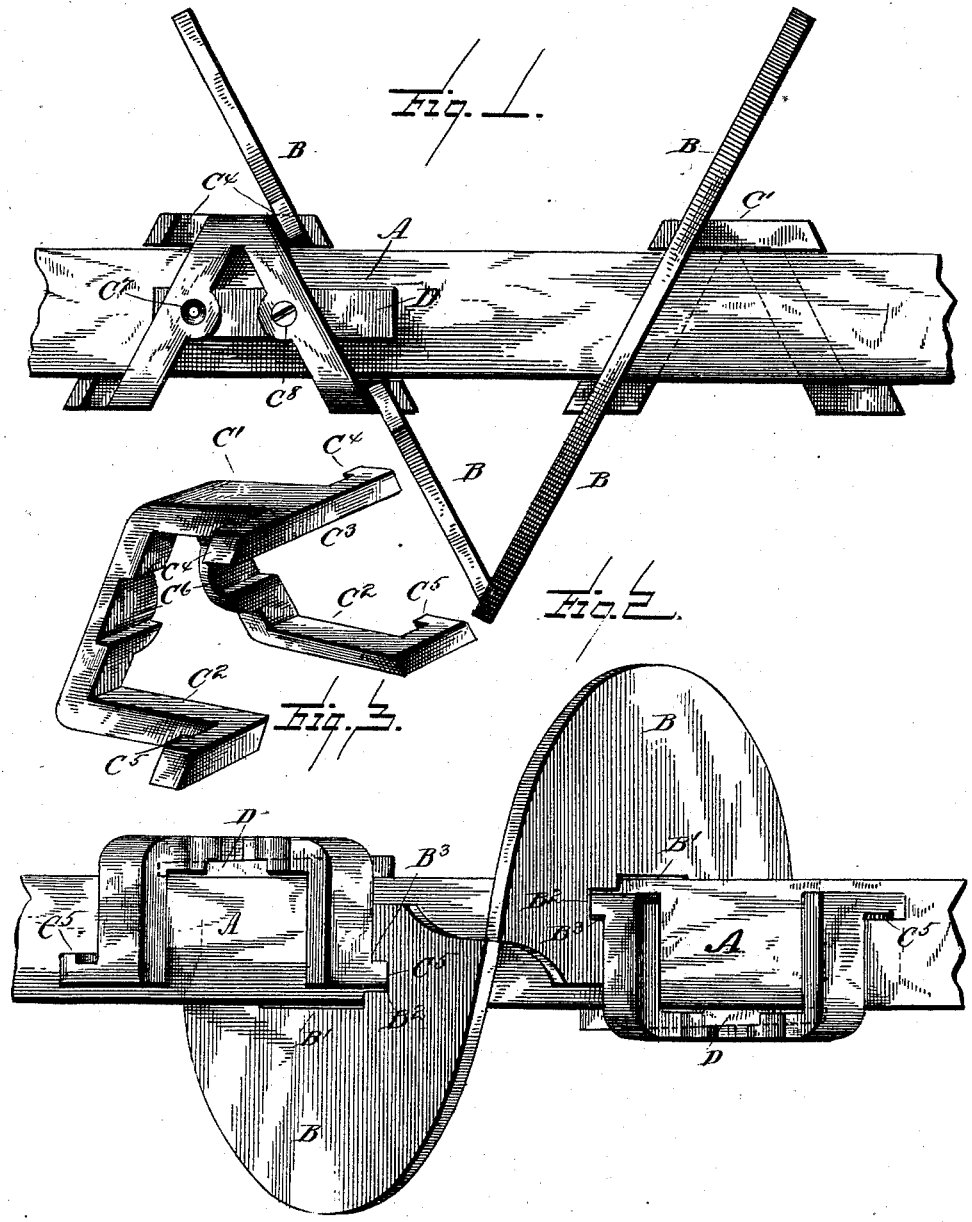

UNITED STATES PATENT OFFICE.

JAMES A. GOWANS, OF STRATFORD, ONTARIO, CANADA, ASSIGNOR, BY DIRECT AND MESNE ASSIGNMENTS, TO WILLIAM W. ALLIS, OF MILWAUKEE, WISCONSIN, AND J. M. DUNCAN, OF BOSTON, MASSACHUSETTS.

SCREW CONVEYER.

SPECIFICATION forming part of Letters Patent No. 422,766, dated March 4, 1890.

Application filed November 27, 1886. Serial No. 220,030. (No model.)

*To all whom it may concern:*

Be it known that I, JAMES A. GOWANS, a subject of the Queen of Great Britain, residing at Stratford, in the Province of Ontario, Canada, have invented certain new and useful Improvements in Conveyers, of which the following is a specification, reference being had therein to the accompanying drawings.

This invention has relation to conveyers for grain and other material.

The object is to provide a flight so constructed and mounted upon the shaft as to be disposed with relation to the shaft to form either a right or left hand conveyer.

Other objects and advantages of the invention will appear in the following description, and the novel features thereof will be particularly pointed out in the claims.

Referring to the drawings, Figure 1 is a side elevation, and Fig. 2 a plan, of one form of my invention applied to a shaft which is square in cross-section. Fig 3 is a perspective of one form of bracket Like letters indicate like parts in all the figures of the drawings.

A represents the shaft, and B the flight. The latter is of substantially semi-disk form and may be made of sheet, cast, or wrought metal, as desired. The flights are secured to the shaft by means of a bracket on which the flight is mounted, as shown in Figs. 1 and 2. In the first form the bracket C partly embraces the shaft and is provided with inclined bearings $C^4$ for the reception, retention, and disposition of the flight when connected therewith. In this form each bracket is provided with oppositely-inclined bearings $C^4$, whereby it may serve to dispose the flight at oppositely-inclined relative positions with the shaft to produce a right or left hand conveyer. In this form also the flight is recessed, as at $B'$ $B^2$ $B^3$, so as to partly embrace the shaft and projections on the arms $C'$ $C^2$ of the bracket, where, by additional projections $C^5$ on said arms and a securing device D, in wedge form, which enters grooves $C^6$, formed in the bracket and bearing against the shaft A, the flight and bracket are rigidly bound in position. A set-screw $C^8$ may be employed in this form to prevent displacement of the wedge.

The operation of the invention is apparent from the foregoing description. Withdrawing the wedge D loosens the bracket C, so as to permit of removing the flight from the inclined bearings on one side of the bracket to those on the other without necessarily removing the bracket from the shaft.

Having described my invention and its operation, what I claim is—

1. As an improved article of manufacture, a flight-bracket comprising a body portion and oppositely-disposed inclined bearings, angular arms having projections at their ends, and transverse grooves, as $C^6$, between said ends and the junction of the arms with the body of the bracket, substantially as shown and described.

2. The combination, with the flight-bracket formed with opposite inclined bearings, and inclined arms having right-angled ends parallel with said bearings and formed with projections, the said arms being provided near their junction with the body with transverse tapered grooves, of a flight recessed to partially embrace a shaft, a shaft, and a wedge-shaped securing device engaging the grooves in the arms and bearing against the shaft, substantially as shown and described.

In testimony whereof I affix my signature, in presence of two witnesses, this 23d day of November, 1886.

JAMES A. GOWANS.

Witnesses:
AAIRD ADAIR,
EDMUND J. BEATTY.